US012750444B2

(12) United States Patent
Lopez et al.

(10) Patent No.: US 12,750,444 B2
(45) Date of Patent: Sep. 29, 2026

(54) SYSTEMS AND METHODS FOR BLOCKING OR ALLOWING CALLS IN A WIRELESS NETWORK

(71) Applicant: Verizon Patent and Licensing Inc., Basking Ridge, NJ (US)

(72) Inventors: Alejandro Lopez, South Bound Brook, NJ (US); Lulia Ann Barakat, McKinney, TX (US); Timothy M. Dwight, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 18/520,194

(22) Filed: Nov. 27, 2023

(65) Prior Publication Data

US 2025/0175554 A1 May 29, 2025

(51) Int. Cl.

*H04M 3/22* (2006.01)
*H04M 3/42* (2006.01)

(52) U.S. Cl.

CPC ...... *H04M 3/2281* (2013.01); *H04M 3/42034* (2013.01); *H04M 2203/6045* (2013.01)

(58) Field of Classification Search

CPC ........... H04M 3/2281; H04M 3/42034; H04M 2203/6045

See application file for complete search history.

(56) References Cited

U.S. PATENT DOCUMENTS

| | | | | |
|---|---|---|---|---|
| 9,060,057 | B1 * | 6/2015 | Danis | H04L 63/083 |
| 9,277,049 | B1 * | 3/2016 | Danis | H04M 3/54 |
| 2006/0135144 | A1 * | 6/2006 | Jothipragasam | H04M 3/42289 455/419 |
| 2012/0155332 | A1 * | 6/2012 | Chang | H04L 65/1104 370/259 |
| 2017/0332226 | A1 * | 11/2017 | Bharatia | H04W 76/10 |
| 2018/0176372 | A1 * | 6/2018 | Algard | H04M 3/42102 |
| 2021/0329117 | A1 * | 10/2021 | Yang | H04W 12/12 |
| 2021/0344730 | A1 * | 11/2021 | Jing | H04L 65/1016 |
| 2022/0272621 | A1 * | 8/2022 | Takakura | H04W 8/22 |

* cited by examiner

*Primary Examiner* — Dhaval V Patel

(57) ABSTRACT

In some implementations, a network element may receive information indicating a list of user equipments (UEs) that are off a wireless network. The network element may receive a verification request to verify a call received by the wireless network. The network element may determine, in response to the verification request and based on the information, whether a UE authorized to use a calling number associated with the call is on the wireless network. The network element may transmit an indication of whether the UE is on the wireless network.

20 Claims, 7 Drawing Sheets

300

SYSTEMS AND METHODS FOR BLOCKING OR ALLOWING CALLS IN A WIRELESS NETWORK

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications.

DETAILED DESCRIPTION OF EXAMPLE EMBODIMENTS

Figure 1:
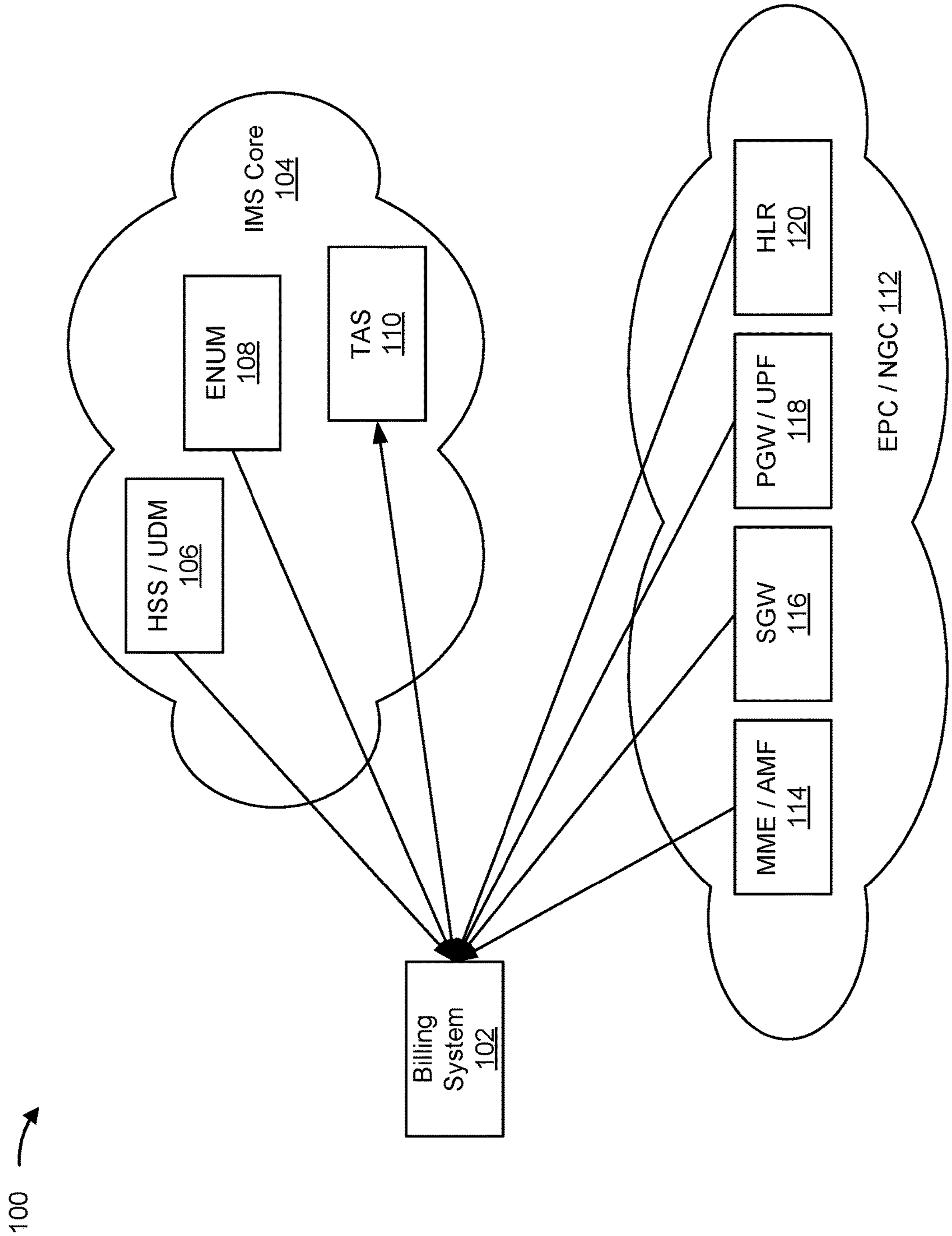
FIG. 1 is a diagram of an example associated with blocking or allowing calls in a wireless network.

The following detailed description of example implementations refers to the accompanying drawings. The same reference numbers in different drawings may identify the same or similar elements.

In order to facilitate provision of telecommunications service, a telephony service provider (TSP) may assign a telephone number to an individual or company subscribing for such service. That number may be stored in a secure manner, in a UE such as a telecommunications device or a subscriber identification module (SIM) within the UE, where the UE may be in the subscriber's possession. A system employed by the network providing telecommunication services to the calling UE may through exchange of credentials between the UE and the network, verify that calls using that telephone number to identify the source of the call, were originated by that UE. Such a system is generally not able to verify who (what person) made the call, since this would require collection, transmission and verification of biometric data.

An assumption may be made that the UE belongs to and remains under the control of a specific person. As a shorthand, the telephone number may be described as being associated with the user herein, but in actuality, an identity of the person making a call may not be verified. Rather, a system may verify that the call was made by a UE whose SIM has been authorized by the carrier that owns the telephone number signaled as a calling number (also referred to as calling party number (CPN)) in a call request, to use that telephone number in that way. As assumption may be made that the SIM is in the UE in the possession of the user who subscribed to the voice service, and an assumption may be made that it was that user who placed the call. An association of calling number and user may not necessarily be verified.

An Internet Protocol (IP) multimedia subsystem (IMS) core may allow incoming calls from other networks to be processed without knowledge of whether the calling number is authentic, as long as the calling number is not outright blocked through a blocklist or by the use of analytics. The prevalence of illegally spoofed calling numbers has given rise to a variety of third-party services and equipment designed to protect consumers. However, existing infrastructure in a wireless network may be used to help protect consumers from unwanted spoofed calls or fraudulent calls.

A UE may periodically register with the IMS from which they are obtaining telecommunications service. Unless the UE is roaming, that IMS may be operated by or on behalf of the TSP with which their owner has subscribed for such service (e.g., their "home" IMS). At the time of registration with the home IMS, the UE and the network may mutually authenticate through exchange of credentials, and establish a security association through which communication is thereafter exchanged. Subsequently when the UE initiates a call, the UE indicates in the signaling message a telephone number it would prefer to use on that call, to identify itself and by extension, its user. The network determines whether the UE is authorized to use that number. If it is not, the network replaces it with a number the UE is authorized to use.

When a call from such a UE terminates to another UE served by the same IMS, the calling party number is assumed to be valid. Call by call authentication of calling party number is not required. When calls are received from another IMS, the receiving IMS may need to determine whether such an authentication took place. For this purpose the originating IMS provides in the signaling message, a cryptographically protected data object containing the parameters whose validity has been verified (the CPN and possibly others) and information designed to protect against other forms of fraud (e.g., replay attacks). The terminating IMS may decrypt and process that object to determine the validity of the protected information (including but not limited to CPN) and to detect other forms of fraud.

The wireless network may be open to certain vulnerabilities. For example, a telephone number that exists within an operator's wireless network may be spoofed. The telephone number may have been assigned by a national numbering authority to a TSP receiving a call, and assigned by a receiving TSP to a subscriber for use on a specific UE, which may be registered with that same TSP when the call is received. Spoofing may be leveraged for fraud calls (e.g., calls whose CPN is spoofed), such as Doppelganger calls, in which the calling number is the same as a called number. For example, a user answering a call may see the user's own number on a caller identifier (ID) screen. Caller ID spoofing has been used to gain access to the voicemail box of the subscriber to whom the spoofed number is assigned, in cases where the voicemail system uses caller ID for authentication. In some cases, an originating carrier may send traffic to a terminating carrier's IMS core using calling numbers belonging to the terminating carrier. Such spoofing may degrade an overall security of the wireless network.

In some implementations, an extension may be defined to the verification of the CPN received in calls from another network (which may or may not be IMS based), which may be useful when a cryptographically protected data object is not present in the received call request message, and as a means to ensure that such a data object if present was not encoded fraudulently. By comparing the CPN in the received call request message with the status of the UE to which that number is assigned, this procedure (when such status is known) may reveal whether the CPN was used properly or was spoofed.

In some implementations, network elements, such as Fourth Generation (4G) and 5G network elements, may be leveraged to determine whether a UE is on or off a wireless network. The UE may be on the wireless network to which the UE is subscribed (e.g., a home network) when the UE's IMS registration is with its home network (which may be applicable only when the UE is using IMS services such as voice), when the UE's packet core registration is with its home network, and when the UE is attached to an access network operated by or affiliated with its home network. The UE may be off network when the UE is not on network, which may include when the UE is powered off, or registered with a network to which the UE is not subscribed (e.g., the UE is roaming). The network elements may reside in an EPC, a 5GC, and/or an IMS core. Other proprietary network elements may be used to complement an overall system. The other proprietary network elements may include secure telephone identity revisited (STIR) based network elements, signature-based handling of asserted information using tokens (SHAKEN) based network elements, a session border controller (SBC) (which may be part of the IMS), and/or a billing system.

Spoofed calls trying to use a subscriber's telephone number (e.g., the telephone number is assigned to the subscriber) when a corresponding UE is attached to the wireless network may be blocked. In other words, when the UE associated with the telephone number is attached to the wireless network (e.g., when a UE housing a SIM to which the telephone number is assigned is attached to the wireless network), and during this time, the same calling number is used by another UE that is outside of the wireless network, the call may be blocked. In the case of an on-network call, the network elements may verify that the credentials provided by a UE that originated the call match with records maintained by a network (in the HSS). When a match is found, the call may be allowed. When a match is not found, the call may be blocked. When the UE provides credentials that show the UE is not actually authorized to use the calling number, the call may be blocked. Calls originated by an on-net UE may never be blocked by an originating network due to a spoofed CPN because such UEs cannot spoof their CPN.

In some implementations, the network elements may be leveraged to allow an originating TSP to inform a TSP receiving a call request that it has authorized the UE to identify itself using a signaled CPN (e.g., the former may be allowed to inform the latter that the call is not spoofed). Different carriers may communicate such that one carrier may notify another carrier that a calling number indicated in a call request was authorized by the carrier to which the calling number is assigned, to be used in calls originating by a calling UE. In this case, the call may be marked as not being a spoofed call. An additional layer of systemic security may be added for consumers and their telephone numbers. The additional layer of security may reduce a likelihood that a consumer is fooled into answering a call with a spoofed CPN, which may improve an overall experience when using the wireless network.

FIG. 1 is a diagram of an example 100 associated with blocking or allowing calls in a wireless network. As shown in FIG. 1, example 100 includes a billing system 102, an IMS core 104, and an EPC and/or a Next Generation core (NGC) (EPC/NGC) 112. The IMS core 104 may include a home subscriber service (HSS) or a unified data management (UDM) (HSS/UDM) 106. The IMS core 104 may include a number mapping (ENUM) element 108. The IMS core 104 may include a telephony application server (TAS) 110. The EPC/NGC 112 may include a mobility management entity (MME) or an access and mobility management function (AMF) (MME/AMF) 114. The EPC/NGC 112 may include a serving gateway (SGW) 116. The EPC/NGC 112 may include a packet data network gateway (PGW) or a user plane function (UPF) (PGW/UPF) 118. The EPC/NGC 112 may include a home location register (HLR) 120. The IMS core 104 and the EPC/NGC 112 may be associated with a wireless network.

In some implementations, the billing system 102 may collect information and/or data from the wireless network. For example, the EPC/NGC 112 may update the IMS core 104 when a UE (e.g., a mobile phone) associated with a user is on the wireless network or off the wireless network, even when the UE is roaming. The billing system 102 may receive information indicating a list of UEs that are off the wireless network. The billing system 102 may receive the information from a home HSS/UDM 106, which may be a network element shared by a packet core and an IMS. When the wireless network receives a call (e.g., a call from another carrier, as opposed to a call originated by the wireless network's own subscriber), the TAS 110 may transmit a verification request to the billing system 102. The billing system 102 may receive the verification request from the TAS 110, which may indicate a calling number associated with the call. The billing system 102 may determine, in response to the verification request and based on the information, whether the UE authorized to use the calling number is on the wireless network or off the wireless network.

In some implementations, the billing system 102 may determine whether there is a UE with an IMS registration that is authorized to use that calling number, and if so, whether or not the UE is roaming. If there is no such UE, then this calling number may not belong to a terminating carrier, so a conclusion with respect to its validity may only be drawn by determining and querying the carrier to which the calling number is assigned. If there is such a UE and it is not remaining, then the calling number is spoofed. In some implementations, the calling number may or may not be assigned to any UE. TSPs may be assigned numbers by a numbering authority in blocks. Not every calling number assigned to a network operator is assigned to a UE. When a call is received whose CPN is assigned to the network operator but has not been assigned by the network operator to any UE, the call may be spoofed. When the CPN is assigned and the UE to which the CPN is assigned is either registered with an IMS or not registered anywhere (e.g., the UE may be powered off), then the call is spoofed. When the CPN is assigned and the UE to which the CPN is assigned is registered with another circuit switched (CS) network (e.g., the UE is roaming in a Universal Mobile Telecommunications Service (UMTS) network), then the call may or may not be spoofed.

In some implementations, the billing system 102 may transmit, to the TAS 110, an indication of whether the calling number is associated with the UE that is on the wireless network or off the wireless network. The TAS 110 may execute an action of approving the call or denying the call, which may be based on the indication received from the billing system 102. The call may be received from another wireless network. For example, when the indication indicates that the calling number is associated with the UE that is already registered to the wireless network, the TAS 110 may deny or block the call (e.g., when a UE authorized to use CPN 'X' is currently registered in the home network, and a call with CPN=X is received by the home network from another network, that call is spoofed). The TAS 110 may deny the call because it would be implausible for that calling number to be used for an incoming call to the wireless network, and thus, the call is likely a fraudulent call using a spoofed calling number. When the indication indicates that the calling number is associated with the UE that is currently not connected to the wireless network, the TAS 110 may approve the call. Thus, the call may be blocked or allowed based on the indication. In some cases, the call may be marked, such that a called party may be allowed to decide whether to accept the call. A visual indication of the marking may be shown on the UE to allow the called party to decide whether to accept the call.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
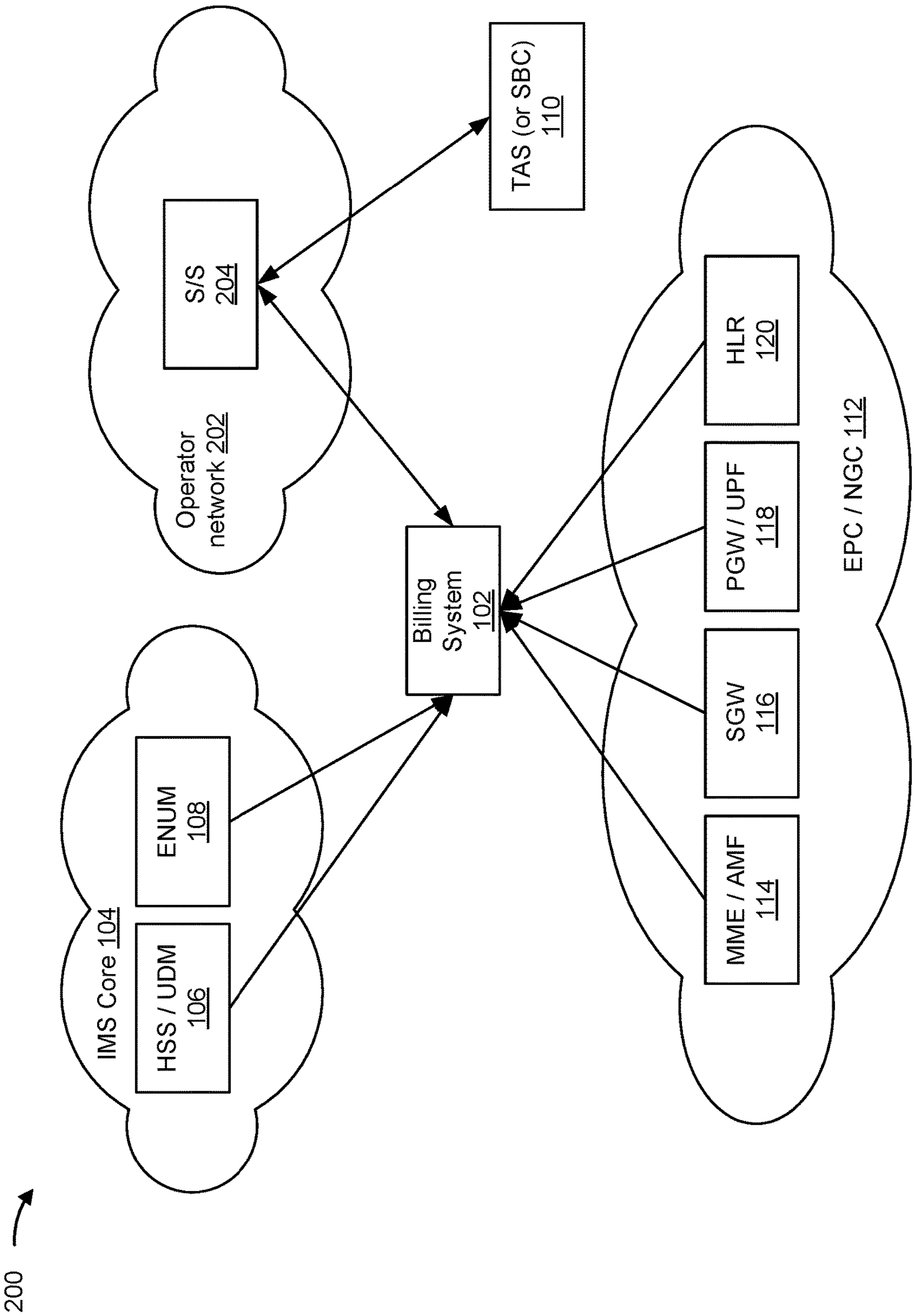
FIG. 2 is a diagram of an example associated with blocking or allowing calls in a wireless network.

FIG. 2 is a diagram of an example 200 associated with blocking or allowing calls in a wireless network. As shown in FIG. 2, example 200 includes a billing system 102, an IMS core 104, an EPC/NGC 112, and an operator network 202. The IMS core 104 may include an HSS/UDM 106 and an ENUM element 108. The EPC/NGC 112 may include an MME/AMF 114, an SGW 116, a PGW/UPF 118, and an HLR 120. The operator network 202 may include a STIR/SHAKEN (S/S) network element 204. The STIR/SHAKEN network element 204 may communicate with a TAS 110 (or an SBC). The IMS core 104, the EPC/NGC 112, and the operator network 202 may be associated with a wireless network.

In some implementations, the billing system 102 may collect information and/or data from the wireless network. For example, the EPC/NGC 112 may update the IMS core 104 when a UE (e.g., a mobile phone) associated with a user is on the wireless network or off the wireless network, even when the UE is roaming. When the wireless network receives a call, the STIR/SHAKEN network element 204 may transmit a verification request to the billing system 102. The verification request may be for verifying the call. The STIR/SHAKEN network element 204 may transmit the verification request for an audit of the UE making the call. In other words, the verification request may be associated with auditing a calling party when calling a network subscriber. The STIR/SHAKEN network element 204 may provide, along with the verification request or as part of the verification request, an indication of a signer associated with the calling number. The STIR/SHAKEN network element 204 may indicate that the call was signed by a particular carrier, which may provide the billing system 102 with a reputable source regarding an originator of the call. However, reputational preference would not be given to certain signers. In other words, knowledge of who signed a given call may not be used to give preferential treatment to that call.

In some implementations, the billing system 102 may receive the verification request, which may indicate the calling number associated with the call. The billing system 102 may correlate the calling number to data collected from the IMS core 104 (and various other network elements). The billing system 102 may determine whether the calling number is associated with the UE that is on the wireless network or off the wireless network. The billing system 102 may transmit an indication associated with the determination to the STIR/SHAKEN network element 204. When the UE is on the wireless network, the STIR/SHAKEN network element 204 may insert an inbound verification (Verstat) value of telephone number validation denied (e.g., TN-Validation-Denied) into the indication, and the indication with the inbound verification value may be relayed by the STIR/SHAKEN network element 204 to the TAS 110 (or the SBC). The STIR/SHAKEN network element 204 may send an indication to its client system that the call in question is likely fraudulently spoofed. In this example, the indication may include a STIR/SHAKEN based value indicating whether a calling number validation is denied.

In some implementations, the TAS 110 may execute an action of approving the call or denying the call, which may be based on the indication relayed by the STIR/SHAKEN network element 204. For example, when the indication indicates that the UE authorized to use the calling number is on the wireless network, the TAS 110 may deny the call. The TAS 110 may deny the call because it would be implausible for the UE that is authorized to use the calling number to make an incoming call to the wireless network, and thus, the call is likely a fraudulent call. When the indication indicates that the UE authorized to use the calling number is off the wireless network, the TAS 110 may approve the call. In this example, the billing system 102 may not directly communicate with the TAS 110 (or the SBC), but rather may communicate with the TAS 110 (or the SBC) via the STIR/SHAKEN network element 204.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
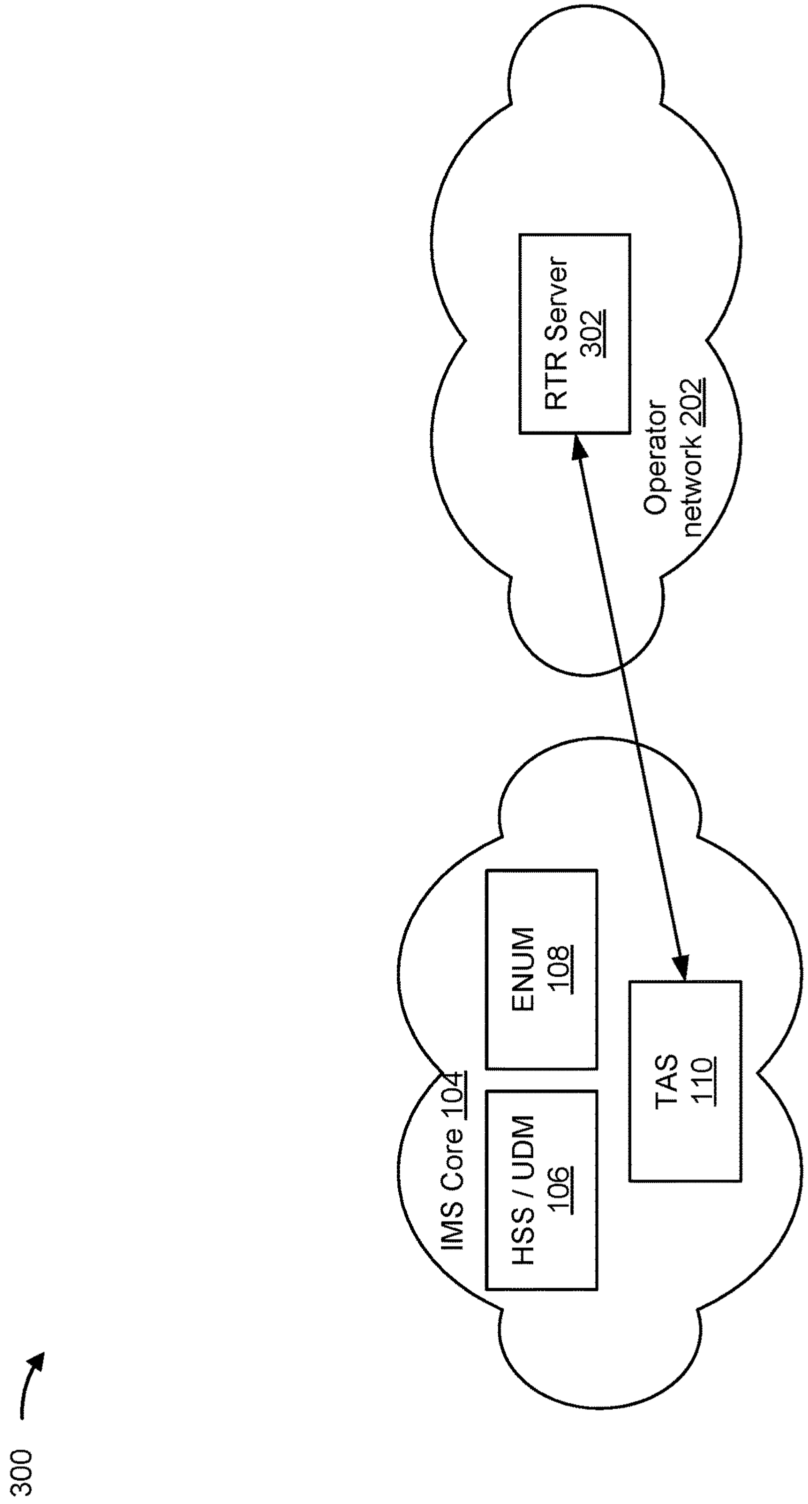
FIG. 3 is a diagram of an example associated with blocking or allowing calls in a wireless network.

FIG. 3 is a diagram of an example 300 associated with blocking or allowing calls in a wireless network. As shown in FIG. 3, example 300 includes an IMS core 104 and an operator network 202. The IMS core 104 may include an HSS/UDM 106, an ENUM element 108, and a TAS 110. The operator network 202 may include a real-time reporting (RTR) server 302 (or billing server). The IMS core 104 and the operator network 202 may be associated with a wireless network.

In some implementations, the TAS 110 may detect a call received by the wireless network. After the wireless network receives the call, the TAS 110 may transmit, to the RTR server 302, a query for verifying whether a UE that placed the call was authorized to identify itself using a CPN specified in that call. The query may be an enabled by a RESTful API, or any similar form of real time machine to machine communication. The RTR server 302, based on the query, may determine in real-time whether or not the UE that placed the call was authorized to identify itself using a CPN specified in that call.

In some implementations, the API may be used to allow other companies to query each other when auditing a calling party. For example, the wireless network may be associated with a first carrier and the RTR server 302 may be associated with a second carrier. The RTR server 302 may be used to verify calls from a wireless network associated with the second carrier.

In some implementations, the RTR server 302 may be a real-time reporting server that collects real-time information regarding calls placed in one or more wireless networks. The real-time information may indicate, for each call, a calling number associated with the call and a time duration of the call. The RTR server 302 may store records of calls placed by a plurality of telephone numbers. The RTR server 302 may generate and store a record each time a call is placed within the wireless network. The record may indicate a telephone number associated with the call, a start time associated with the call, an end time associated with the call, and the time duration associated with the call.

In some implementations, the TAS 110 may receive, from the RTR server 302 and in response to the query, a response indicating whether the UE that originated the call was authorized to identify itself using the signaled CPN. The TAS 110 may perform an action based on whether the UE that placed the call was authorized to identify itself using the signaled CPN. The RTR server 302 may indicate, to the TAS 110, that the UE that placed the call was authorized to identify itself using the signaled CPN. The RTR server 302 may verify that the UE associated with the valid subscriber was used to place the call. In this case, the TAS 110, after receiving such an indication from the RTR server 302, may allow the call. In some implementations, the RTR server 302 may indicate, to the TAS 110, that the UE associated with the valid subscriber did not place the call. The RTR server 302 may verify that the UE associated with the valid subscriber was not used to place the call. In this case, the TAS 110, after receiving such indication from the RTR server 302, may block the call based on an assumption that the call is fraudulent. In other words, the call may appear to be coming from a UE, but that UE may not actually be making the call, so the call may be blocked by the TAS 110.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
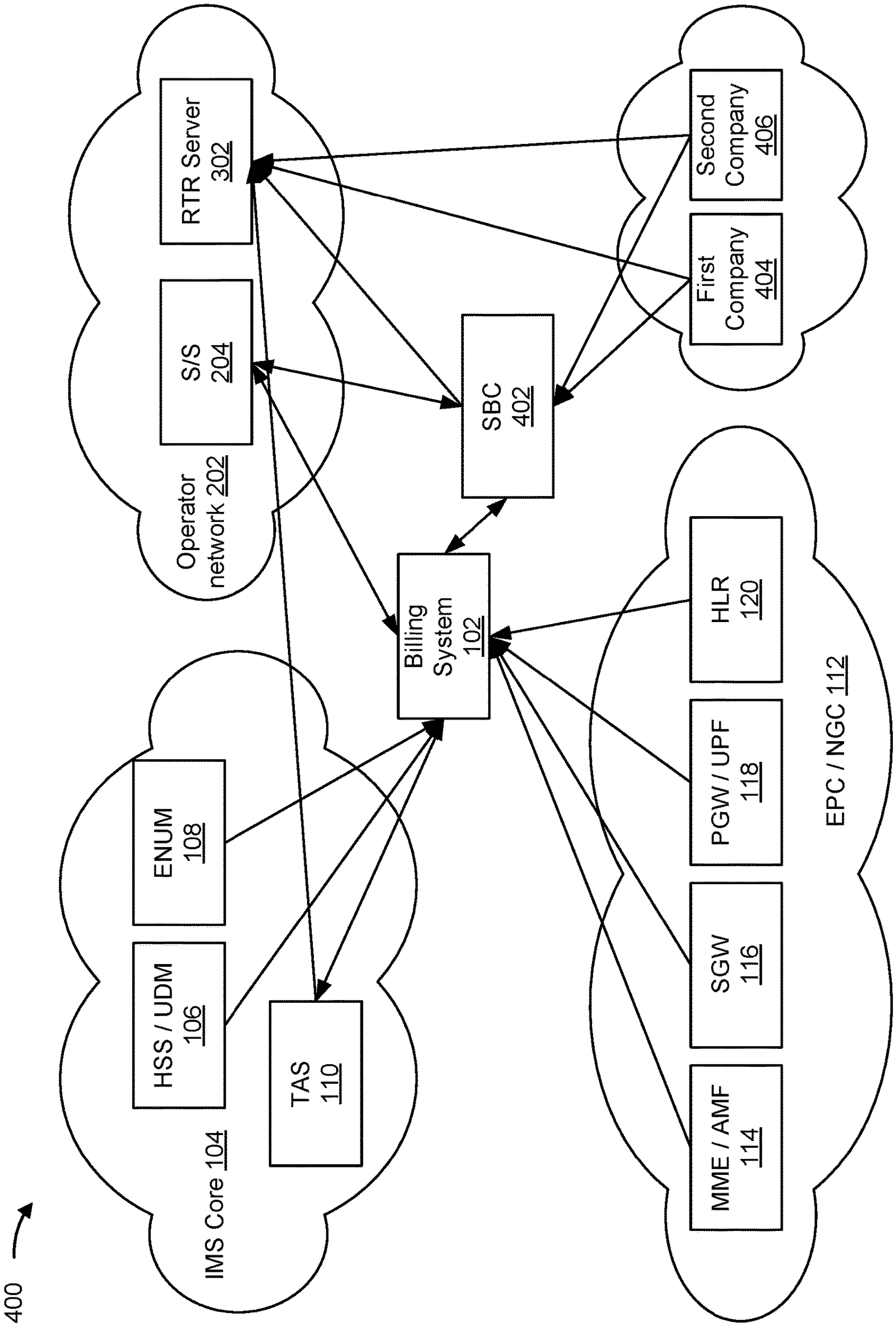
FIG. 4 is a diagram of an example associated with blocking or allowing calls in a wireless network.

FIG. 4 is a diagram of an example 400 associated with blocking or allowing calls in a wireless network. As shown in FIG. 4, example 400 includes a billing system 102, an IMS core 104, an EPC/NGC 112, an operator network 202, and an SBC 402. The IMS core 104 may include an HSS/UDM 106, an ENUM element 108, and a TAS 110. The EPC/NGC 112 may include an MME/AMF 114, an SGW 116, a PGW/UPF 118, and an HLR 120. The operator network 202 may include a STIR/SHAKEN (S/S) network element 204 and an RTR server 302. The SBC 402 and the RTR 302 may communicate with a first network element associated with a first company 404 and/or a second network element associated with a second company 406, where the first company 404 and the second company 406 may be associated with different wireless networks.

In some implementations, when the wireless network receives a call, the billing system 102 may receive a verification request. The billing system 102 may receive the verification request from the TAS 110 and/or the STIR/SHAKEN network element 204. The verification request may be for verifying a calling number associated with the call. The billing system 102 may receive the verification request, which may indicate the calling number associated with the call. The billing system 102 may correlate the calling number to data collected from the IMS core 104 (and various other network elements). The billing system 102 may determine whether the calling number is associated with a UE that is on the wireless network or off the wireless network. In other words, the billing system 102 may determine whether the same calling number is already being used by a user currently registered with the wireless network. The billing system 102 may relay information associated with the determination to the TAS 110.

In some implementations, the STIR/SHAKEN network element 204 may provide, along with the verification request or as part of the verification request, an indication of a signer associated with the call. The STIR/SHAKEN network element 204 may indicate that the call was signed by a particular carrier, which may provide the billing system 102 with a reputable source regarding an originator of the call. Knowledge of the signer, when combined with other information, may enable a calculation of a reputational score that can be associated with signers and thereafter inherited by calls they sign. Thus, the billing system 102 may be provided with necessary data to help audit a calling party when calling a network subscriber. The billing system 102 may use the indication received from the STIR/SHAKEN network element 204 when determining whether the same calling number is already being used by the user associated with the wireless network. The billing system 102 may relay information associated with the determination to the STIR/SHAKEN network element 204. When the calling number is on the wireless network, as indicated by the relayed information, the STIR/SHAKEN network element 204 may insert a Verstat value of telephone number validation denied (e.g., TN-Validation-Denied), which may be relayed by the STIR/SHAKEN network element 204 to the TAS 110 (or the SBC).

In some implementations, when the wireless network receives the call, the TAS 110 may transmit a query to the RTR server 302. The TAS 110 may send a query for verifying whether a UE that placed the call was authorized to identify itself using a CPN specified in that call. The RTR server 302, based on the query, may determine in real-time whether or not the UE that placed the call was authorized to identify itself using a CPN specified in that call. The RTR server 302 may store records of calls placed by a plurality of telephone numbers. The RTR server 302 may generate and store a record each time a call is placed within the wireless network. The record may indicate a telephone number associated with the call, a start time associated with the call, an end time associated with the call, and a time duration associated with the call. The API query may be used to allow other companies to query each other when auditing a calling party. In some implementations, the RTR server 302 may indicate, to the TAS 110, that the UE that placed the call was authorized to identify itself using the signaled CPN.

In some implementations, the RTR server 302 may be queried to verify whether the UE authorized to use the calling number did or did not place the call. Network elements associated with other companies, where such network elements may be associated with other networks, may also query the RTR server 302 to verify whether UEs that placed calls were authorized to identify themselves using signaled CPNs. As a result, different companies associated with different networks may coordinate with each other to ensure that UEs that are authorized to use certain calling numbers are being used to place legitimate calls, rather than calling numbers may be used by devices that are not authorized to use the calling numbers. As a result, spoofed telephone numbers, which may be telephone numbers used in an unauthorized manner, may be prevented.

In some implementations, the TAS 110 may determine a handling of a call. The TAS 110 may determine whether to block the call or whether to allow the call, depending on gathered information. The TAS 110 may determine whether to mark or tag the call, such that a called party may determine whether to accept the call. In some implementations, the TAS 110 may execute an action of approving the call or denying the call based on the information received from the billing system 102. For example, when the information indicates that the calling number is associated with the UE that is already connected to the wireless network, the TAS 110 may deny the call. When the information indicates that the calling number is associated with the UE that is currently not connected to the wireless network, the TAS 110 may approve the call. In some implementations, the TAS 110 may execute the action of approving the call or denying the call based on information relayed by the STIR/SHAKEN network element 204. In some implementations, the TAS 110 may execute the action of approving the call or denying the call based on information relayed by the RTR server 302. For example, after receiving an indication from the RTR server 302 that the UE authorized to use the calling number placed the call, the TAS 110 may allow the call. As another example, after receiving an indication from the RTR server 302 that the UE authorized to use the calling number did not place the call, the TAS 110 may block the call based on an assumption that the call is fraudulent.

In some implementations, the billing system 102 and/or the TAS 110 may relay information to the SBC 402. The SBC 402 may be responsible for allowing the call or for blocking the call, as opposed to the TAS 110. In some cases, the SBC 402 may directly receive information from the STIR/SHAKEN network element 204 and/or the RTR server 302, and such information may be used by the SBC 402 to determine whether to allow the call or deny the call.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
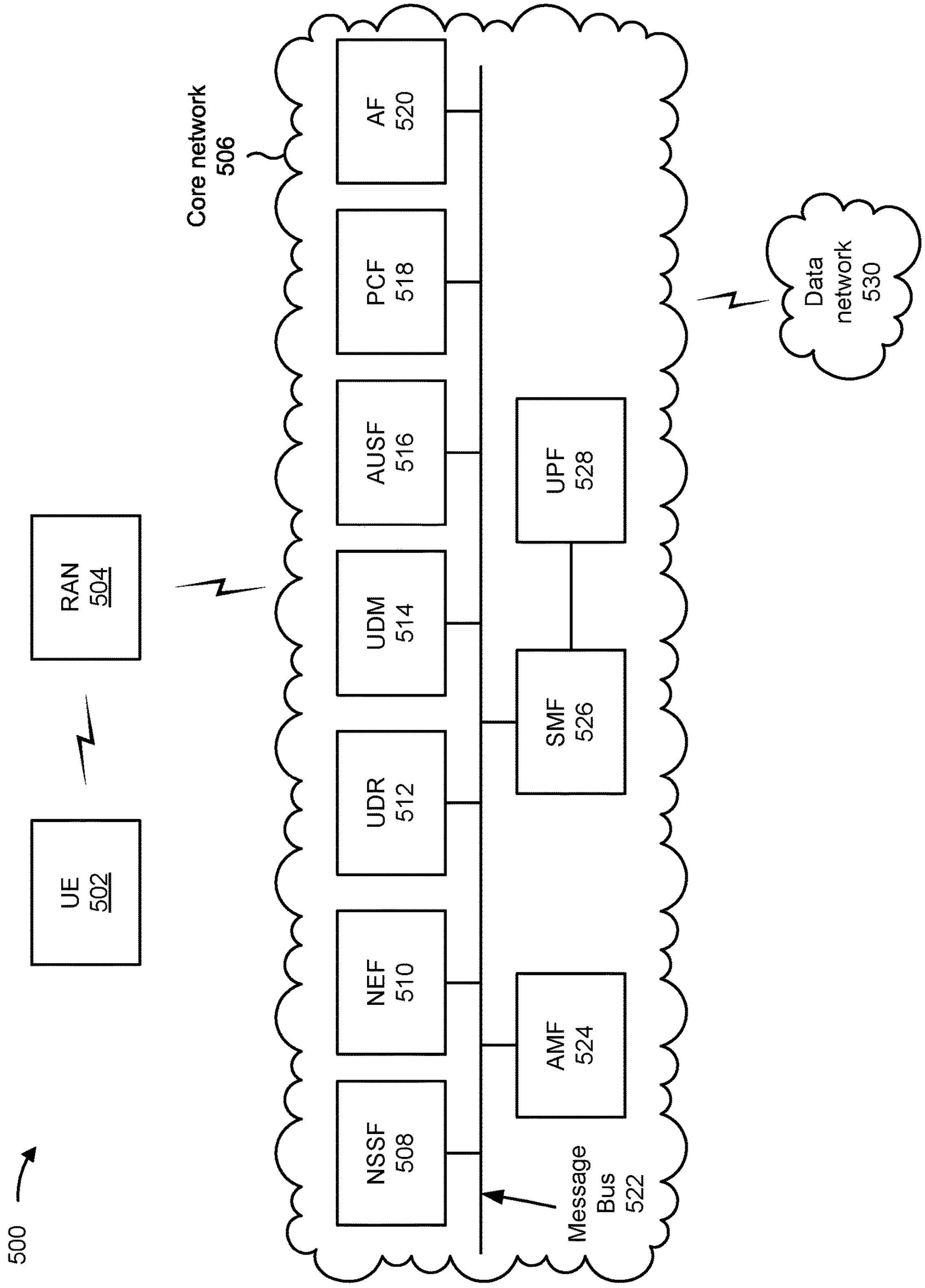
FIG. 5 is a diagram of an example environment in which systems and/or methods described herein may be implemented.

FIG. 5 is a diagram of an example environment 500 in which systems and/or methods described herein may be implemented. As shown in FIG. 5, example environment 500 may include a UE 502, a RAN 504, a core network 506, and a data network 530. Devices and/or networks of example environment 500 may interconnect via wired connections, wireless connections, or a combination of wired and wireless connections.

The UE 502 may include one or more devices capable of receiving, generating, storing, processing, and/or providing information, such as information described herein. For example, the UE 502 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 504 may support, for example, a cellular radio access technology (RAT). The RAN 504 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 502. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 504 may transfer traffic between the UE 502 (e.g., using a cellular RAT), one or more base stations (e.g., using a wireless interface or a backhaul interface, such as a wired backhaul interface), and/or the core network 502. The RAN 504 may provide one or more cells that cover geographic areas.

In some implementations, the RAN 504 may perform scheduling and/or resource management for the UE 502 covered by the RAN 504 (e.g., the UE 502 covered by a cell provided by the RAN 504). In some implementations, the RAN 504 may be controlled or coordinated by a network controller, which may perform load balancing, network-level configuration, and/or other operations. The network controller may communicate with the RAN 504 via a wireless or wireline backhaul. In some implementations, the RAN 504 may include a network controller, a self-organizing network (SON) module or component, or a similar module or component. In other words, the RAN 504 may perform network control, scheduling, and/or network management functions (e.g., for uplink, downlink, and/or sidelink communications of the UE 502 covered by the RAN 504).

In some implementations, the core network 506 may include an example functional architecture in which systems and/or methods described herein may be implemented. For example, the core network 506 may include an example architecture of a 5G NG core network included in a 5G wireless telecommunications system.

As shown in FIG. 5, the core network 506 include a number of functional elements. The functional elements may include, for example, a network slice selection function (NSSF) 508, a network exposure function (NEF) 510, a unified data repository (UDR) 512, a unified data management (UDM) 514, an authentication server function (AUSF) 516, a policy and control function (PCF) 518, an application function (AF) 520, an access and mobility management function (AMF) 524, a session management function (SMF) 526, and/or a user plane function (UPF) 528. Each of the functional elements shown in FIG. 5 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 508 may include one or more devices that select network slice instances for the UE 502. The NSSF 508 may allow an operator to deploy multiple substantially independent end-to-end networks potentially with the same infrastructure. In some implementations, each slice may be customized for different services. The NEF 510 may include one or more devices that support exposure of capabilities and/or events in the wireless telecommunications system to help other entities in the wireless telecommunications system discover network services.

The UDR 512 may include one or more devices that provide a converged repository, which may be used by network functions to store data. For example, a converged repository of subscriber information may be used to service a number of network functions. The UDM 514 may include one or more devices to store user data and profiles in the wireless telecommunications system. The UDM 514 may generate authentication vectors, perform user identification handling, perform subscription management, and perform other various functions. The AUSF 516 may include one or more devices that act as an authentication server and support the process of authenticating the UE 502 in the wireless telecommunications system.

The PCF 518 may include one or more devices that provide a policy framework that incorporates network slicing, roaming, packet processing, and/or mobility management, among other examples. The AF 520 may include one or more devices that support application influence on traffic routing, access to the NEF 510, and/or policy control, among other examples. The AMF 524 may include one or more devices that act as a termination point for non-access stratum (NAS) signaling and/or mobility management, among other examples. The SMF 526 may include one or more devices that support the establishment, modification, and release of communication sessions in the wireless telecommunications system. For example, the SMF 526 may configure traffic steering policies at the UPF 528 and/or may enforce UE IP address allocation and policies, among other examples. The UPF 528 may include one or more devices that serve as an anchor point for intra-RAT and/or inter-RAT mobility. The UPF 528 may apply rules to packets, such as rules pertaining to packet routing, traffic reporting, and/or handling user plane quality of service (QoS), among other examples. A message bus 522 may represent a communication structure for communication among the functional elements. In other words, the message bus 522 may permit communication between two or more functional elements.

The data network 530 may include one or more IP-based wired and/or wireless data networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example environment 500 may perform one or more functions described as being performed by another set of devices of example environment 500.

Figure 6:
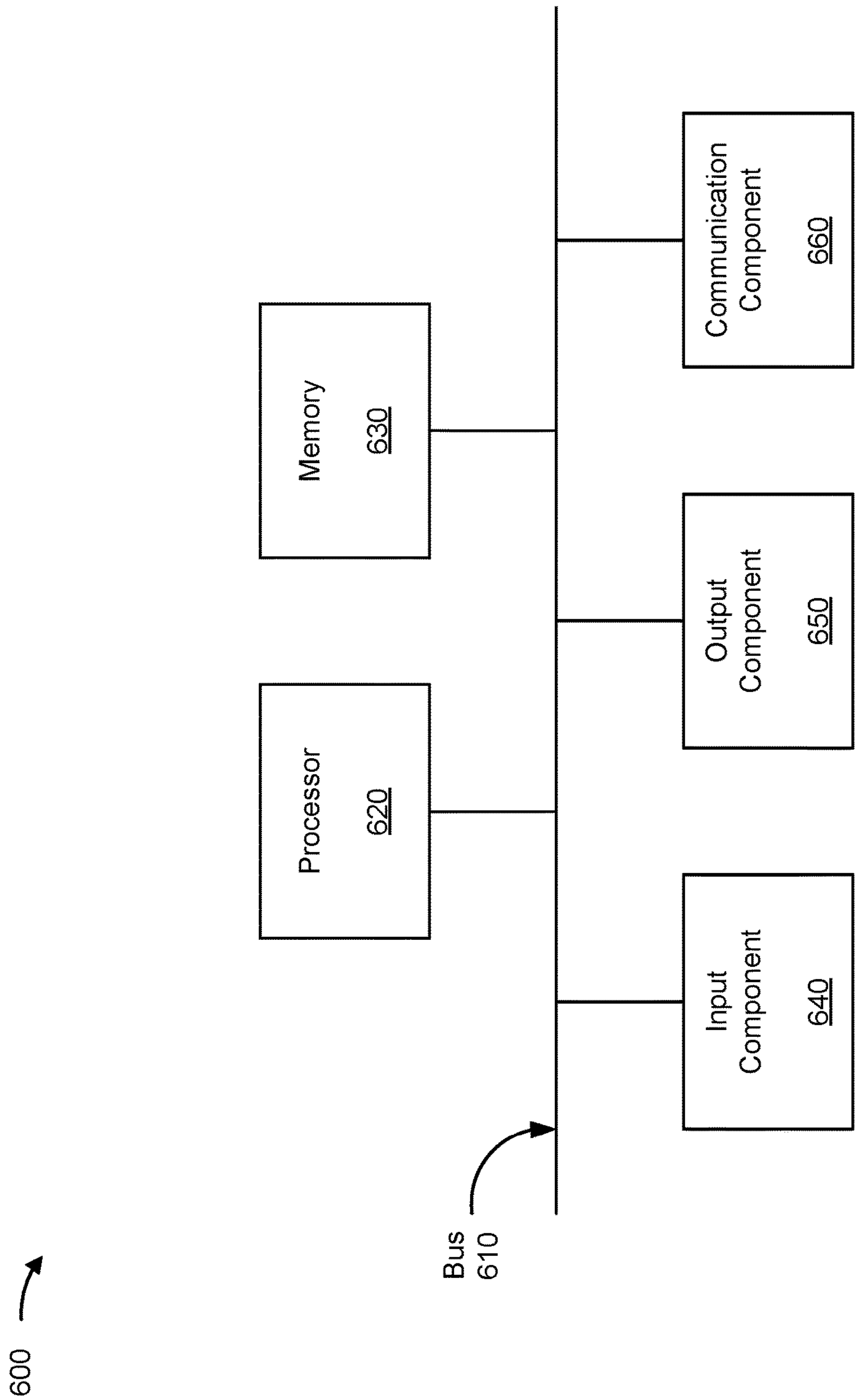
FIG. 6 is a diagram of example components of one or more devices of FIG. 5.

FIG. 6 is a diagram of example components of a network element 600 associated with blocking or allow calls in a wireless network. The network element 600 may correspond to a network device (e.g., billing system 102, TAS 110, STIR/SHAKEN network element 204, RTR server 302, and/or SBC 402). In some implementations, the network device may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
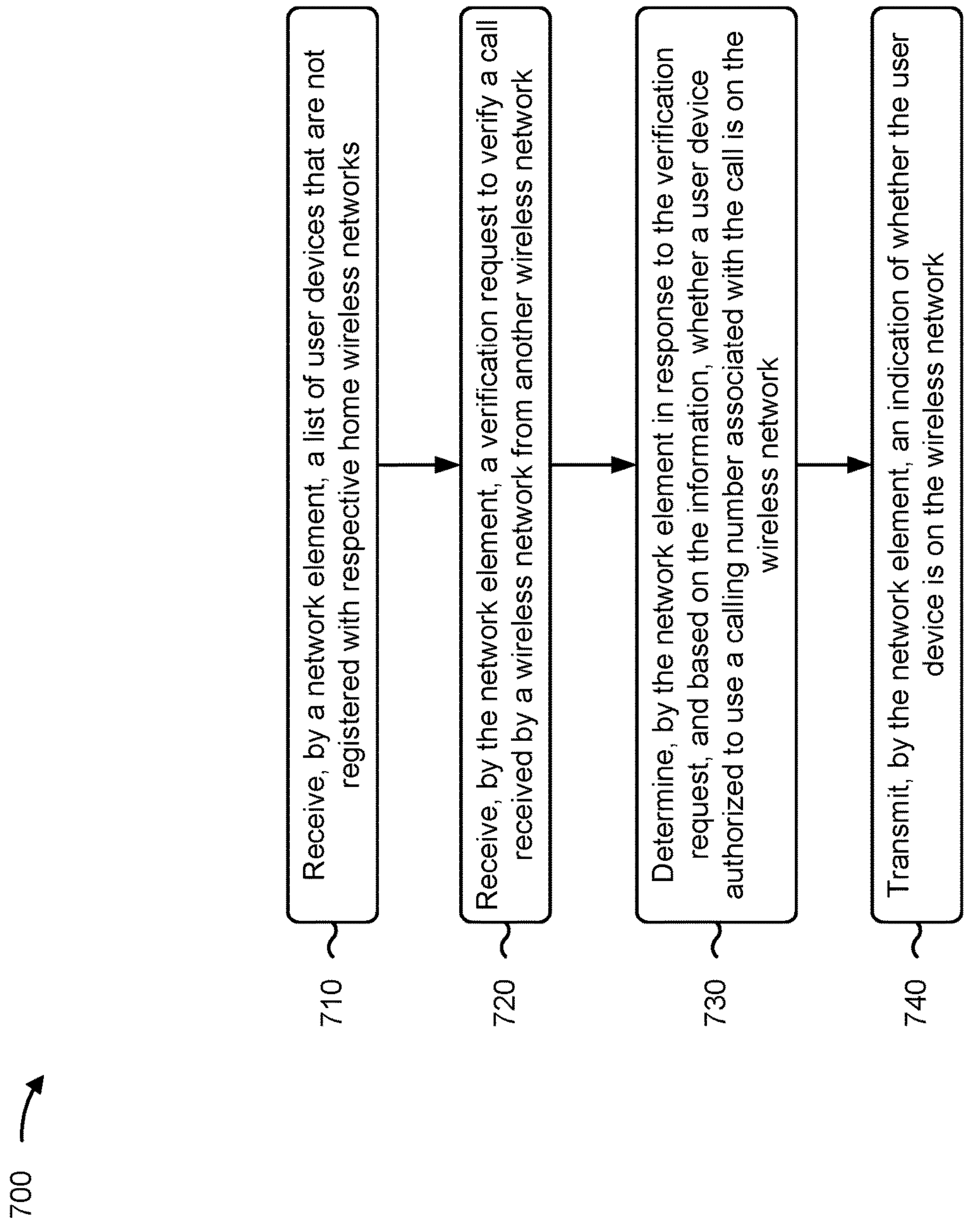
FIG. 7 is a flowchart of an example process associated with blocking or allowing calls in a wireless network.

FIG. 7 is a flowchart of an example process 700 associated with blocking or allow calls in a wireless network. In some implementations, one or more process blocks of FIG. 7 may be performed by a network device (e.g., billing system 102, TAS 110, STIR/SHAKEN network element 204, RTR server 302, and/or SBC 402). In some implementations, one or more process blocks of FIG. 7 may be performed by another device or a group of devices separate from or including the network device. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving information indicating a list of UEs that are not registered with respective home wireless networks (block 710). Each UE on the list may not be registered with their home wireless network. The information may be received from an EPC or an NGC and an IMS core.

As shown in FIG. 7, process 700 may include receiving a verification request to verify a call received by a wireless network from another wireless network (block 720). The call may be between separate wireless networks. The verification request may be received from a TAS. In some implementations, the verification request may include an indication of a signer associated with an originator of the call. The verification request may be received from a STIR/SHAKEN network element.

As shown in FIG. 7, process 700 may include determining, in response to the verification request, and based on the information, whether a UE authorized to use a calling number associated with the call is registered with the wireless network (block 730). SHAKEN results (when the call was signed) and results of verifying a CPN may be correlated to determine whether the call is likely to have been spoofed.

As shown in FIG. 7, process 700 may include transmitting an indication of whether the UE is on the wireless network (block 740). The indication may be transmitted to the TAS. The call may be blocked or allowed based on the indication. In some implementations, the indication may be transmitted to the TAS or an SBC via the STIR/SHAKEN network element.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network element, information indicating a list of user equipments (UEs) that are not registered with respective home wireless networks;

receiving, by the network element, a verification request to verify a call received by a wireless network from another wireless network;

determining, by the network element in response to the verification request, and based on the information, whether a UE authorized to use a calling number associated with the call is on the wireless network; and transmitting, by the network element, an indication of whether the UE is on the wireless network.

2. The method of claim 1, wherein the information is received from an evolved packet core (EPC) or a Next Generation core (NGC) and an internet protocol multimedia system (IMS) core.

3. The method of claim 1, wherein:

the verification request is received from a telephony application server (TAS); and the indication is transmitted to the TAS.

4. The method of claim 1, wherein the call is blocked or tagged based on an indication that the UE authorized to use the calling number is on the wireless network and the call originated from outside the wireless network.

5. The method of claim 1, wherein the call is allowed based on an indication that the UE authorized to use the calling number is off the wireless network and the call originated from outside the wireless network.

6. The method of claim 1, wherein the verification request includes an indication of a signer associated with an originator of the call.

7. The method of claim 1, wherein the verification request is received from a secure telephone identity revisited or signature-based handling of asserted information using tokens (STIR/SHAKEN) network element.

8. The method of claim 1, wherein the indication is transmitted to a telephony application server (TAS) or a session border controller (SBC) via a secure telephone identity revisited or signature-based handling of asserted information using tokens (STIR/SHAKEN) network element.

9. A network element, comprising:

one or more processors configured to:

detect a call received by a wireless network;

transmit, to a server, a query for verifying whether a user equipment (UE) authorized to use a calling number associated with the call placed the call;

receive, from the server and in response to the query, a response indicating whether the UE authorized to use the calling number placed the call; and perform an action based on the response, wherein the server is a real-time reporting server that collects real-time information regarding a plurality of calls placed in one or more wireless networks, and the real-time information indicates, for each of the plurality of calls, an associated calling number and an associated time duration.

10. The network element of claim 9, wherein the one or more processors, to perform the action, are configured to block the call based on the response indicating that the UE authorized to use the calling number did not place the call.

11. The network element of claim 9, wherein the one or more processors, to perform the action, are configured to allow the call based on the response indicating that the UE authorized to use the calling number did place the call.

12. The network element of claim 9, wherein the query is an application programming interface (API) query.

13. The network element of claim 9, wherein the one or more processors are further configured to:

transmit a verification request to verify the calling number associated with the call received by the wireless network; and receive, in response to the verification request, an indication of whether the calling number is associated with the UE authorized to use the calling number that is on the wireless network or off the wireless network.

14. The network element of claim 9, wherein the wireless network is associated with a first carrier and the server is associated with a second carrier.

15. A non-transitory computer-readable medium storing a set of instructions, the set of instructions comprising:

one or more instructions that, when executed by one or more processors of a network element, cause the network element to:

detect a call received by a wireless network;

transmit, to a server, a query for verifying whether a user equipment (UE) authorized to use a calling number associated with the call placed the call;

receive, from the server and in response to the query, a response indicating whether the UE authorized to use the calling number placed the call; and perform an action based on the response, wherein the server is a real-time reporting server that collects real-time information regarding a plurality of calls placed in one or more wireless networks, and the real-time information indicates, for each of the plurality of calls, an associated calling number and an associated time duration.

16. The non-transitory computer-readable medium of claim 15, wherein the one or more instructions, when executed by the one or more processors, further cause the network element to:

block the call based on the response.

17. The non-transitory computer-readable medium of claim 15, wherein the one or more instructions, when executed by the one or more processors, further cause the network element to:

allow the call based on the response.

18. The non-transitory computer-readable medium of claim 15, wherein the query includes an indication of a signer associated with an originator of the call.

19. The network element of claim 9, wherein the one or more processors are further configure to correlate results of signature-based handling of asserted information using tokens (SHAKEN) with results of verifying the calling number to determine whether the call is likely to have been spoofed.

20. The non-transitory computer-readable medium of claim 15, wherein the one or more instructions, when executed by the one or more processors, further cause the network element to:

correlate results of signature-based handling of asserted information using tokens (SHAKEN) with results of verifying the calling number to determine whether the call is likely to have been spoofed.

* * * * *